(No Model.)

A. H. RAMEY & J. EYE.
CAKE TURNER.

No. 589,753. Patented Sept. 7, 1897.

Witnesses:
Frank P. Prindle.
Henry C. Hazard.

Inventors:
Alfred H. Ramey
and Jacob Eye
by Prindle and Russell
attys

UNITED STATES PATENT OFFICE.

ALFRED H. RAMEY AND JACOB EYE, OF AURORA, ILLINOIS.

CAKE-TURNER.

SPECIFICATION forming part of Letters Patent No. 589,753, dated September 7, 1897.

Application filed December 10, 1896. Serial No. 615,167. (No model.)

*To all whom it may concern:*

Be it known that we, ALFRED H. RAMEY and JACOB EYE, of Aurora, in the county of Kane, and in the State of Illinois, have invented certain new and useful Improvements in Cake-Turners; and we do hereby declare that the following is a full, clear, and exact description thereof, reference being had to the accompanying drawings, in which—

Figure 1:
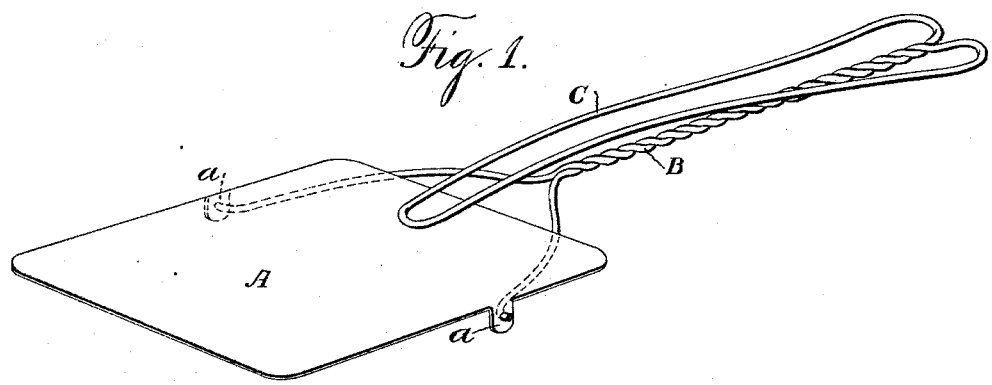
Figure 2:
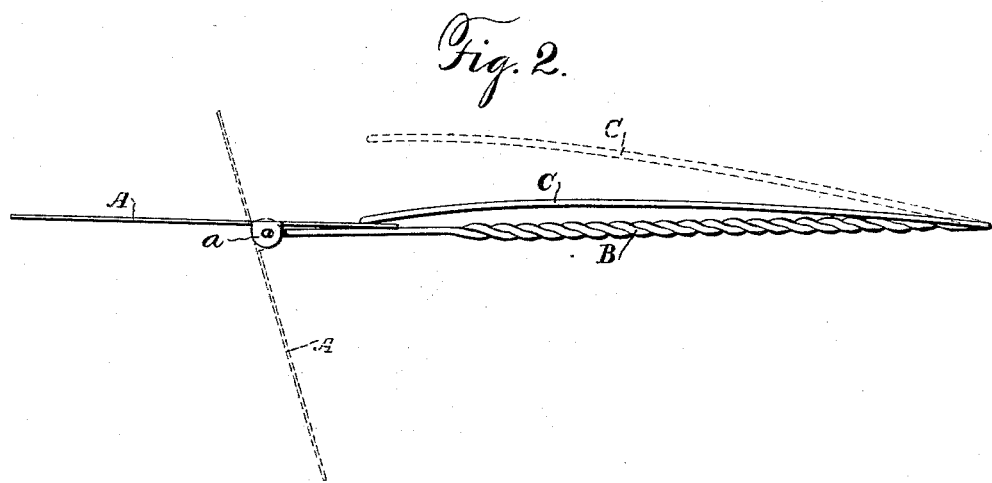

Figure 1 is a perspective view of our device arranged to pick up a cake preparatory to turning; and Fig. 2, a side elevation of the same, the full lines showing the position of parts before and the latter after turning.

Letters of like name and kind refer to like parts in each of the figures.

The design of our invention is to provide a most simple and cheap device for turning cakes when being cooked; and to this end said invention consists in the cake-turner constructed substantially as hereinafter described.

In the carrying of our invention into practice we employ a preferably rectangular piece or plate A, of sheet metal, and on opposite sides at a point in rear of its longitudinal center pivotally connect it by ears $a$ and $a$ to a handle B. Said handle is preferably made of wire, being twisted, as shown, for a portion of its length to give it stiffness and a tasty appearance, and curved inward in substantially a semicircle from each of its points of connection with the plate A. From its outer end the wire is bent or curved laterally on opposite sides of the twisted portion and is then carried forward in the form of a spring member C to a point over the inner end of the plate A when the latter is swung so that it lies in a plane parallel with the main part of the handle and rests at its rear ends upon the curved portion thereof.

It will be noted that the construction of the handle B and its spring member C is such that a single piece of wire can be used to make the same.

The manner of using our device is as follows: The point of pivotal connection between the plate A and handle B being such that the former, when the handle is horizontal, tends to swing to the inclined position shown in dotted lines in Fig. 2, when it is desired to turn a cake said plate is swung from such position to a horizontal position, as shown in full lines, and is there held by pressing the spring member C downward until its front end engages the then rear end of the plate. The handle being grasped at its end the member C can be very readily held in this position by the thumb. The plate A is now passed in the ordinary manner beneath the cake to be turned and then lifted, with the cake upon it, a suitable distance, say four or five inches. Upon releasing the spring member C it will fly upward and permit the unbalanced plate A to swing on its pivot, its upper end moving to a point forward of its pivot and its lower end to a point in rear thereof, with the result that the cake is automatically delivered to the cooking utensil in an inverted position.

Having thus described our invention, what we claim is—

1. A cake-turner comprising a handle and a plate pivoted to the handle and swinging freely on its pivot with more weight on one side of its pivot than the other, and means for holding said plate from swinging which consists of a part that is movable into and out of contact therewith, substantially as and for the purpose specified.

2. A cake-turner comprising a handle, a plate pivoted eccentrically to the handle and swinging freely on its pivot, and means to restrain said plate from swinging on its pivot, which consists of a part that is movable into and out of the path of movement of the shorter side thereof, substantially as and for the purpose described.

3. A cake-turner comprising a handle, a plate pivoted eccentrically to the handle, and a spring member attached to the handle adapted to be engaged with said plate, substantially as and for the purpose set forth.

4. A cake-turner comprising a plate, a handle to which the same is pivoted, and a movable part, attached at one end to and extending in the same direction as the handle, and having its free end adapted to be engaged with and disengaged from said plate, substantially as and for the purpose shown.

5. A cake-turner comprising a plate, a handle to which the same is pivoted, formed of wire, and a yielding extension from one end of said handle whose free end is adapted to be engaged with and disengaged from said plate, substantially as and for the purpose specified.

In testimony that we claim the foregoing we have hereunto set our hands this 24th day of November, 1896.

ALFRED H. RAMEY.
JACOB EYE.

Witnesses:
E. T. PRINDLE,
GEORGE W. ALSCHULER.